July 14, 1959  W. TALBOT  2,894,390
LIQUID LEVEL SENSING MEANS
Filed Aug. 20, 1954

FIG. 3   FIG. 4   FIG. 5

INVENTOR
WARREN TALBOT

BY George H. Fisher

ATTORNEY

United States Patent Office 2,894,390
Patented July 14, 1959

2,894,390
LIQUID LEVEL SENSING MEANS

Warren Talbot, Columbia Heights, Minn., assignor to Minneapolis-Honeywell Regulator Company, Minneapolis, Minn., a corporation of Delaware Application August 20, 1954, Serial No. 451,273

1 Claim. (Cl. 73—295)

The present invention is concerned with control apparatus, and more particularly with a fluid level sensing means for use with an electrical network for measuring the quantity of fluid in a container. The present invention relates to so-called "hot wire" type of liquid level gage and is concerned specifically with a characterized type of resistance probe for use in a hot wire type liquid level gage.

A hot wire type liquid level gage employs a resistance probe as the liquid level sensing means. This resistance element is connected to an electrical network, generally a resistance bridge in the form of a Wheatstone bridge. Electrical energy is thereby applied to the resistance probe and, due to the electrical current flowing through the probe, the probe is heated to a temperature depending upon the environment in which the probe is placed. The probe is adapted to be positioned in a container of fluid and the temperature of the probe will be determined by the height of the fluid in the container. In other words, when the probe is completely immersed in fluid the heat generated by current flowing through the probe will be carried away more readily than when the probe is not immersed in fluid. The temperature and therefor the resistance value of the probe will vary in accordance with the amount of fluid in the container. It is of course understood that a resistance probe of this type must have a temperature coefficient of resistance which is other than zero. Therefore, the resistance value which the resistance probe presents in a Wheatstone bridge is determined by the temperature of the resistance probe.

It is an object of the present invention to provide a characterized resistance probe for use in a hot wire type liquid level gage.

It is a further object of the present invention to provide a resistance probe having a temperature coefficient of resistance other than zero and having incremental changes of resistance throughout the length of the probe which vary in accordance with the cross-sectional area of a container in which the probe is positioned.

It is a further object of the present invention to provide an improved control apparatus utilizing a resistance bridge for liquid level measurement and having a resistance probe whose cross-sectional area varies as a function of the cross-sectional area of the container in which the resistant probe is adapted to be positioned.

These and other objects of the present invention will be apparent to those skilled in the art upon reference to the specification, claim, and drawings, of which:

Figure 3 is a showing of a modification of the resistance probe of Figure 1;

Figure 4 is a further modification of the resistance probe; and

Figure 5 is a cross-sectional view of the resistance probe of Figure 4 along the line 5—5 of Figure 4.

Figure 1:
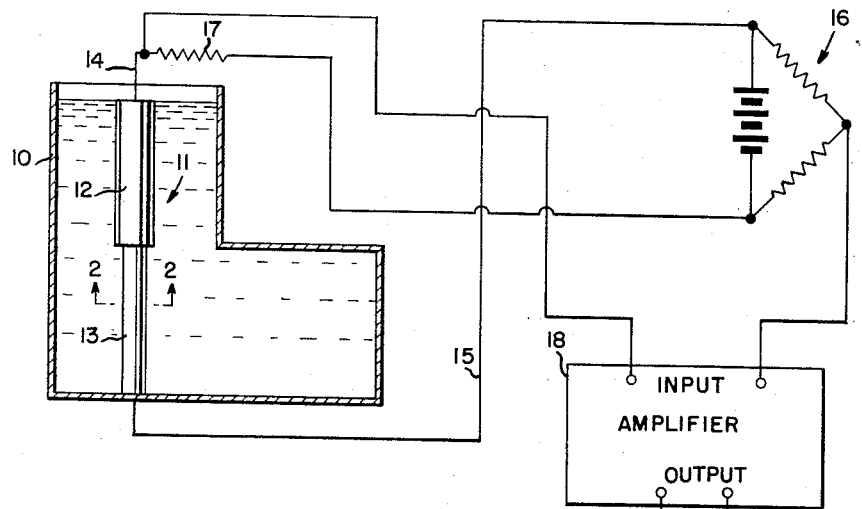
Figure 1 is a representation of the improved control apparatus showing a Wheatstone bridge incorporating the characterized resistance probe.

Referring specifically to Figure 1, the reference numeral 10 designates a tank or container which contains a fluid, such as fuel, the level of which is to be indicated. Mounted within the container 10 is a characterized resistance probe 11. This probe 11 may be mounted within the container 10 in any conventional or convenient manner. In actual practice, probe 11 is a relatively thin conductor and displaces very little fluid in container 10. However, for purposes of explanation, probe 11 is shown very much larger with respect to container 10 than it actually is. The resistance probe 11 has a portion 12 and a lower portion 13. The cross-sectional area of the upper and lower portions of the resistance probe 11 are inversely proportional to the cross-sectional area of the upper and lower portions of the irregulator container 10. As shown in Figure 1, container 10, which is of uniform width, has an upper portion in which the cross-sectional area at any point in the upper portion is one-half of the cross-sectional area at any point in the lower portion of the container 10. Therefore, for this particular container the cross-sectional area of the upper portion 12 of resistance probe 11 would be twice the cross-sectional area of the lower portion 13.

It is well known that the resistance of an electrical conductor varies directly with the resistivity of and length of the conductor and varies indirectly with the cross-sectional area of the conductor. As shown in Figure 1, the length of the portions 12 and 13 of the resistance probe 11 are equal. It will also be assumed that the resistivity of the material is uniform throughout the length of the resistance probe 11. Therefore, since the cross-sectional area of portion 13 is one-half the area of portion 12 the resistance of the respective portions will be the inverse of this. In other words, the resistance of the lower portion 13 measured along the major longitudinal axis of the probe 11 will be twice that of the resistance of the upper portion 12.

Resistance probe 11 is connected by conductors 14 and 15 to be one leg of a Wheatstone bridge designated generally by the reference numeral 16. Probe 11 is heated by current flow in the bridge, and, as will be explained, the resistance of probe 11 is affected thereby. A temperature sensitive resistor 17 located adpacent to the container is provided in a second leg of the Wheatstone bridge 16 to compensate the bridge for temperature variation in the region of the container 10. This feature of temperature compensation is conventional and will not be discussed.

The output of the Wheatstone bridge 16 is connected to a voltage responsive means 18 in the form of an amplifier. The output of amplifier 18 is connected to a meter 19 which includes a scale to indicate the amount of fluid in container 10. It will be recognized that a variety of devices could be substituted for the meter 19 to perform various functions, for example, a valve to control the flow of fuel to the container 10.

The operation of this improved control apparatus can be described by first considering the operation of a Wheatstone bridge. It is well known that when a Wheatstone bridge is in balance there is no output voltage from the output terminals of the bridge. Likewise, the magnitude of the output voltage from the bridge is determined by the amount or degree of unbalance of the bridge. In other words, the greater the unbalance of the bridge the greater the output signal. A voltage responsive means can therefore be connected to the output of the Wheatstone bridge to give an indication of the amount of unbalance of the bridge.

The magnitude of the output voltage of the Wheatstone bridge of Figure 1 is controlled by the magnitude of the resistance of resistance probe 11. Since resistance probe 11 has a temperature coefficient of resistance other than zero the resistance of probe 11 is controlled by its temperature. As shown in Figure 1, resistance probe 11 is completely immersed in fluid. Therefore, there is a good heat conducting path to conduct heat away from probe 11 and maintain its temperature at a minimum. This establishes the state of unbalance of the Wheatstone bridge 16 which feeds a signal to the input of amplifier 18 and causes meter 19 to assume a full indicating position.

The resistance of an electrical conductor having a temperature coefficient of resistance other than zero can be determined by the equation $$R_2 = R_1[1 + a_1(t_2 - t_1)]$$

where $R_2$ is the resistance at a temperature $t_2$, $R_1$ is the resistance at a temperature $t_1$, $a_1$ is the temperature coefficient of resistance of the material. If it is now assumed that the container 10 is empty, it will be immediately recognized that the temperature of both the upper and lower portions 12 and 13 of resistance probe 11 is increased. If it is assumed that the material has a positive temperature coefficient of resistance, it follows that the resistance value of the portions 12 and 13 is increased. However, because of the relative cross-sectional areas of the upper and lower portions, the value $R_1$ of the above-mentioned equation will be different for the two portions 12 and 13. More specifically, the $R_1$ value for the upper portion 12 will be one-half the $R_1$ value for the lower portion 13. Therefore, while the change in temperature for the upper and lower portions of the resistance probe 11 may be equal when the tank is completely empty, the percentage change in resistance of the upper and lower portions will not be equal. This can be seen by assuming values of temperature coefficient of resistance, $t_1$, $t_2$, and $R_1$ for the portions 13 and 12 and utilizing the above equation.

It it is now assumed that the liquid level in container 10 lowers until the upper portion of the container 10 is empty it can be seen that the temperature of the lower portion 13 of the resistance probe remains the same as it was when the tank was completely full. However, the temperature of the upper portion 12 of the resistance probe is raised just the same as if the tank 10 were empty. The above mentioned equation can now be utilized to determine the new resistance of the upper portion 12 of the resistance probe and this resistance value added to the resistance value of the lower portion 13 of the resistance probe determines the new over-all resistance of the resistance probe which is effective in the leg of the Wheatstone bridge 16 to control the input voltage to amplifier 18 thereby causing meter 19 to assume a position showing the new level of liquid in the container 10.

Three specific examples have been explained. However, the above explanation will hold true regardless of the level of fluid in the container 10.

Figure 2:
Figure 2 is a cross-sectional view of the resistance probe of Figure 1 along the line 2—2 of Figure 1.
Figure 2:
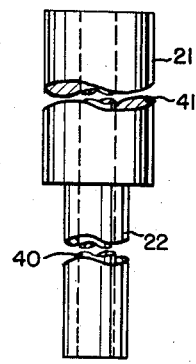
Figure 2:
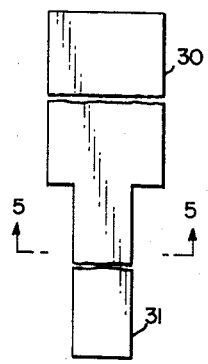
Figure 2:
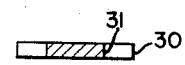

Figure 2 is a showing of the cross-section view of the resistance probe 11 of Figure 1. Probe 11 is made of a homogeneous material.

Figure 3 is a showing of a circular type resistance probe such as shown in Figures 1 and 2 wherein the probe is made up of a core 40 of resistance material having uniform cross-section. This resistance core may be a high resistance material. Plated or deposited in any manner on the surface of this core 40 is a conductive material 41 which may be of low resistance. This material is not of uniform cross-sectional area and has an upper portion 21 and a lower portion 22. In this case, the thickness of material 41 is varied to give a resistance variation which conforms to the irregular cross-sectional area of the container.

The resistance probes of Figures 1, 2 and 3 are circular in cross-section. Figure 4 shows a resistance probe which is made of flat stock. Figure 5 is a cross-sectional view of the resistance probe of Figure 4. This probe has an upper portion 30 and a lower portion 31. Here again, the cross-sectional area of the two portions is a function of the cross-sectional area of the container or tank in which the resistance probe is adapted to be placed.

In the forms shown, it is to be understood that the fluid whose height is being measured is a dielectric fluid such as oil. If the fluid is a conductive fluid such as water, then the resistance probe must be insulated to prevent electrical contact of the fluid with the probe and leads.

From the above description it can be seen that an improved characterized resistance liquid level sensitive probe has been provided for use with a hot wire type liquid level sensing means.

I claim as my invention:

Liquid level sensing apparatus for measuring the quantity of liquid in a container having an irregular cross-section, comprising; an electrical measuring network, a resistance probe adapted to be positioned longitudinally in the container so that when voltage is applied to said probe its resistance value varies in accordance with the height of liquid in the container, means connecting said resistance probe to said network, said resistance probe comprising a rod-like member having an inner high-resistance portion of uniform cross-section and having an outer low-resistance portion of varying cross-sectional area formed over the outer surface of the inner portion, said resistance probe being so formed as to have resistance variations along the length thereof which are a predetermined function of the cross-sectional area of the container.

References Cited in the file of this patent

UNITED STATES PATENTS

| | | |
|---|---|---|
| 2,388,559 | Macintyre | Nov. 6, 1945 |
| 2,582,399 | Smith | Jan. 15, 1952 |
| 2,648,982 | Condon | Aug. 18, 1953 |

FOREIGN PATENTS

| | | |
|---|---|---|
| 129,741 | Great Britain | July 24, 1919 |
| 148,827 | Great Britain | Oct. 10, 1921 |